United States Patent [19]

Sato

[11] 4,118,744
[45] Oct. 3, 1978

[54] TAPE END DETECTION RELEASE DEVICE FOR TAPE RECORDER

[75] Inventor: Masaaki Sato, Hachioji, Japan

[73] Assignee: Olympus Optical Co., Ltd., Tokyo, Japan

[21] Appl. No.: 762,742

[22] Filed: Jan. 26, 1977

[30] Foreign Application Priority Data

Mar. 31, 1976 [JP] Japan .............................. 51/36313
Apr. 15, 1976 [JP] Japan .............................. 51/42735

[51] Int. Cl.² .................... G11B 15/06; G11B 23/08; G11B 15/10; G11B 23/32
[52] U.S. Cl. .................... 360/74; 116/67 A; 226/45; 226/100; 340/675
[58] Field of Search ............ 360/74, 71, 93, 96, 360/95, 72; 340/259, 282; 116/67 A; 226/45, 100; 242/199–200

[56] References Cited

U.S. PATENT DOCUMENTS

| 3,660,810 | 5/1972 | Yoshii | 360/74 |
| 3,694,585 | 9/1972 | Goldner | 360/74 |
| 3,887,943 | 6/1975 | Katsurayama | 360/96 |

Primary Examiner—Alfred H. Eddleman
Attorney, Agent, or Firm—Ostrolenk, Faber, Gerb & Soffen

[57] ABSTRACT

A release device is provided which disables a tape end detection in a tape recorder which is provided with an apparatus for indicating a tape end, such as an end alarm unit or auto "shut-off" unit (which returns a sliding plate carrying a head assembly, thereby producing an audible indication). The release device comprises means including an externally operable member to disable a tape end detection. Said means may be automatically reset in response to a movement of a record/playback actuating member or in response to the loading or removal of a tape cassette. In addition, the release device includes a release inhibit means which prevents the release means from operating when the record/playback member is not in its operative position or when a tape cassette is not loaded.

5 Claims, 16 Drawing Figures

TAPE END DETECTION RELEASE DEVICE FOR TAPE RECORDER

BACKGROUND OF THE INVENTION

The invention relates to a tape end detection release device for tape recorder.

An end alarm unit is known which gives a warning as by audible sound when it is detected that a terminal end of a running tape on a tape recorder is reached. Also known is a so-called auto "shut-off" device which returns a sliding plate carrying a head assembly to its inoperative position to thereby automatically interrupt the record/playback mode when a tape end is reached. When such unit or device is used, an automatic indication of the terminal end of a tape being played is provided for convenience in replacing or inverting a tape cassette. However, the provision of a warning at the end of a running tape is undesirable during a secret recording or during a lecture or conference where the generation of such a sound must be restrained. In addition, means for preventing a warning must be constructed to operate in a reliable manner so as to prevent a failure of preventing a warning, and to resume the warning mode whenever it is desired.

SUMMARY OF THE INVENTION

It is a first object of the invention to provide a release device for releasing the operation of a tape end detector of a recorder through an external operation of the recorder.

It is a second object of the invention to reset the release device automatically in response to a movement of a record/playback actuating member or in response to the loading or removal of a tape cassette from the recorder.

It is a third object of the invention to enable a switching between a tape end warning device and a tape end display device in conjunction with a release operation of the release device.

It is a fourth object of the invention to provide a release inhibit means associated with the release device which prevents a release operation during a record/playback operation of the tape recorder or when a tape cassette is not loaded thereon.

it is a fifth object of the invention to permit a resetting of the release device when the tape recorder is established in its record/playback operation, even if the release device is previously operated to its release position at a time other than a record/playback mode of the tape recorder.

DETAILED DESCRIPTION OF EMBODIMENTS

Figure 1:
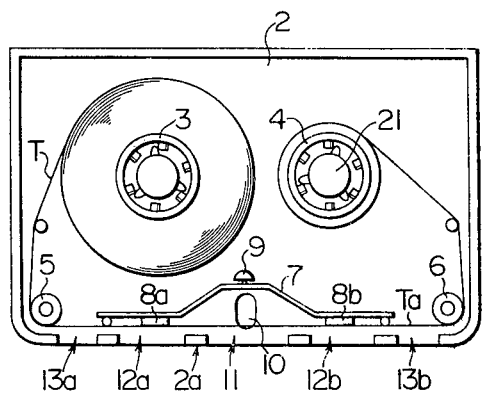
FIG. 1 is a plan view of a microcassette, as developed by the present applicant, with one-half of the cassette removed to show the internal structure.

Referring to FIG. 1, there is shown one-half of a tape cassette, commonly referred to as a microcassette, which is developed by the present applicant, and which may be used in a tape recorder provided with the device according to the invention.

A cassette half 2 has a pair of tape hubs 3, 4 rotatably disposed therein. A length of magnetic tape T has its one end secured to one hub 3 and wound thereon before being passed around guide rollers 5, 6 to extend along and inwardly of slot windows 11, 12a, 12b, 13a and 13b, formed in the front face of the cassette, in taut condition. Subsequently, the tape is disposed on the other hub 4, its other end being anchored thereto. The slot window 11 represents an opening for receiving a pinch roller while the slot windows 12a, 12b located on the opposite sides thereof are adapted to receive a magnetic head. The slot windows 13a, 13b which are further removed from the central window 11 are adapted to receive an erase head. Adjacent to its front surface 2a, the cassette half 2 is formed with a capstan aperture 10 at a position inwardly of the slot window 11. A pair of pads 8a, 8b are secured to a pad supporting leaf spring 7 adjacent to the opposite ends thereof, the leaf spring 7 having its central portion bearing against a fulcrum or support member 9 and having its opposite end portions extending in parallel relationship with the front surface 2a of the cassette half 2. These pads 8a, 8b serve to bear against the rear surface of a tape portion Ta which extends along the slot windows for urging it against a magnetic head, not shown.

Figure 2:
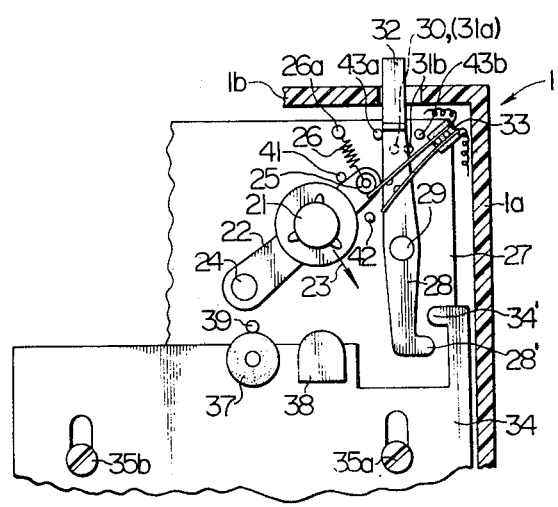
FIG. 2 is a plan view, partly in section, of a tape end detection release device constructed according to one embodiment of the invention as it is assembled into a cassette tape recorder adapted for use in the microcassette shown in FIG. 1.

An example of a tape recorder which plays the microcassette 2 and to which the invention is applied will be described with reference to FIGS. 2 and 3. In FIG. 2, the tape recorder 1 has a chassis 27 on which a shaft 24 is fixedly mounted. A hub lever 22 has its one end rotatably mounted on the shaft 24, and fixedly carries a pin, not shown, intermediate its length, on which the shaft 21 of the tape hub is fitted by using a well known slip mechanism. A switch actuating member 25 in the form of a short sleeve is secured to the free end of the lever 22. The lever 22 is biased to rotate counter-clockwise by a spring 26 which is anchored between the free end lever 22 and a stationary pin 26a. However, the resulting rotation is limited by abutment against a stop pin 41. The rotation of the lever 22 in the clockwise direction is also limited by another stop pin 42. A normally open switch 33 is spaced lengthwise from the lever 22, and has its movable contact located so that its tip is disposed adjacent to the actuating member 25.

In accordance with the invention, a release lever 28 is rotatably mounted on a stationary pin 29 at a position to the right of the lever 22, and extends in parallel relationship with the right-hand sidewall 1a of the tape recorder 1. The upper end of the release lever 28 extends externally through the upper sidewall 1b of the recorder 1 so as to provide a trigger end 32 for turning the lever 28. A nipple 30 is formed to extend from the backside of the lever 28 at a position spaced from the trigger end 32 for selective engagement with a pair of dimples 31a, 31b formed in the chassis 27, thereby achieving a click stop operation of the lever 28. In order to secure a click stop operation of the lever 28, a pair of stop pins 43a, 43b are fixedly mounted on the chassis 27 for constraining the angular movement of the lever 28. The lower end of the lever 28 is bent to extend to the right, providing a tab 28' which may be cammed by a cam portion 34' of a sliding plate 34.

As is well known, the sliding plate 34 fixedly carries a magnetic head 38 and a pinch roller 37 which is adapted to cooperate with a capstan 39 provided on the part of the chassis 27. The plate 34 is slidable in the vertical direction, as viewed in FIGS. 2 and 3, by the engagement of elongated guide slots, formed therein to extend vertically adjacent to the opposite lateral sides of the plate 34, with stationary pins 35a, 35b. In FIG. 2, an external operation has caused the sliding plate 34 to move to its upper position in which a record/playback operation is possible. The cam portion 34' is formed by an L-shaped extension from the upper, right-hand end of the sliding plate 34.

In FIG. 2, the release lever 28 assumes its left-hand position by moving the trigger end 32 to the left, whereby a tape end detection is released. Thus, the lateral edge of the lever 28 bears against the stop pin 43a and the nipple 30 is engaged with the dimple 31a. When a tape end is reached under this condition, the tension in the tape causes the hub shaft 21 to be pulled in the direction of arrow 23, whereby the lever 22 tends to rotate about the shaft 24 in the same direction. However, the rotation of the lever 22 is only slightly permitted, and its further rotation is prevented by the abutment of the right-hand edge thereof against the left-hand side of the lever 28. Thus, the switch actuating member 25 cannot move into abutment against the movable contact of the switch 33, which therefore remains open, failing to activate an alarm or warning device, not shown, which is connected with the switch 33. In this manner, a tape end detection is released. When it is desired to perform a tape end detection, the trigger end 32 may be operated to angularly move the lever 28 in the clockwise direction until the nipple 30 engages the dimple 31b, where it is stopped by a click stop operation. When a terminal end of a running tape is reached, the lever 22 is driven clockwise until it bears against the stop pin 42, so that the actuating member 25 presses against the movable contact of the switch 33, thus closing it. In this manner, the tape end detector becomes operable in the normal manner, and the release device is reset.

However, as long as the lever 28 remains in its release position, the tape end detector remains inoperative. If the lever 28 is inadvertently left in its release position when beginning a recording operation, there may result an inconvenience that a warning cannot be given off at the end of a running tape when such warning is actually needed. In order to avoid such inconvenience, a downward movement of the sliding plate 34 which occurs each time a record/playback operation is interrupted is utilized according to the invention to reset the lever 28 to its inoperative position automatically. Thus, when a record/playback operation of the tape recorder is interrupted in the condition shown in FIG. 2, the sliding plate 34 moves downward, and the cam portion 34' also moves downward. In the course of such movement, the lower, rounded edge of the cam portion 34' bears against the upper, rounded edge of the tab 28' of the lever 28, thus causing a clockwise rotation of the lever 28 to return it to its reset position automatically. It will be noted that the abutment of the semi-circular edge of the tab 28' against the semi-circular edge of the cam portion 34' prevents an unintended rotation of the lever 28 in the counter-clockwise direction and hence to its release position, and that when the sliding plate 34 has moved further downward so as to clear the cam portion 34' from the tab 28' of the lever 28, as the sliding plate 34 is subsequently moved upwardly in order to place it in a record/playback position, the upper edge of the cam portion 34' bears against the lower inclined edge of the tab 28', urging the lever 28 to rotate clockwise. In this manner, it is assured that the release device is rendered inoperative or remains reset when a record/playback mode is established.

Figure 3:
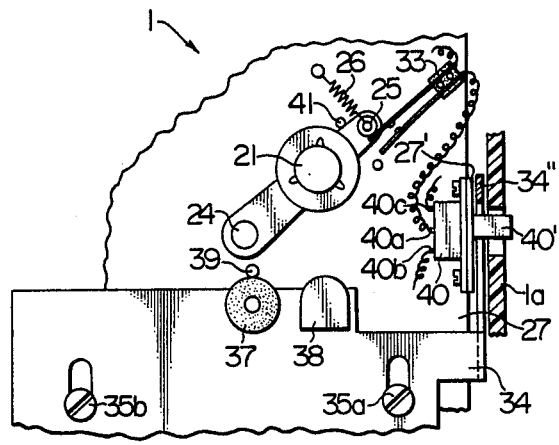
FIG. 3 is a plan view, partly in section, of a tape end detection release device according to another embodiment of the invention which is assembled into a cassette tape recorder using a microcassette of the type shown in FIG. 1.

FIG. 3 shows a modification in that the release lever 28 is replaced by a sliding type switch 40 of the conventional design which is mounted on an upright portion 27' of the chassis 27. The switch 40 includes a knob 40' which extends externally of the right-hand sidewall 1a of the recorder 1 and which may be moved vertically, as viewed in FIG. 3, to open or close the switch. The switch 40 is connected with an alarm or warning device, not shown, in series with the normally open switch 33, and therefore the alarm device remains inoperative whenever one of the switches 33, 40 is open. In FIG. 3, the knob 40' assumes an upper position to open the electrical connection between terminals 40a, 40b. A terminal shown at 40c is not utilized in this arrangement, but may be used in a subsequent embodiment (see FIG. 4). A switch actuating member 34" is formed by an upward extension of an upright portion, which is bent at right angles from the right-hand edge of the sliding plate 34, with the free end of the upward extension being bent to form a hook to bear against an intermediate portion of the knob 40' from above. In the condition shown, since the knob 40' assumes an upper position, the connection between the terminals 40a, 40b is disconnected to turn off the switch 40, preventing an operation of the alarm device even if the switch 33 is closed. Thus, the described arrangement operates in a manner similar to that of the embodiment of FIG. 2 when the release lever 28 is placed in its release position.

Referring to FIG. 3, when a record/playback operation is interrupted under the condition shown, the sliding plate 34 is moved downward, whereby the switch actuating member 34" moves downward to force the knob 40' downward. Thereupon, the connection between the terminals 40a, 40b is completed to close the switch 40. When a record/playback mode is established subsequently, an upward movement of the sliding plate 34 does not result in a shifting of the knob 40', whereby the switch 40 remains closed, preventing a release of the tape end detection upon closure of the switch 33. Thus the release means is reset by moving the record/playback actuating member to its inoperative position, in a similar manner as the resetting of release lever 28 in the embodiment of FIG. 2.

The idle terminal 40c of the switch 40 may be advantageously utilized to provide a switching from the alarm or warning device to a display device in a simple manner. In this instance, the terminals 40a to 40c of the switch 40 are connected as shown in the circuit diagram of FIG. 4. Thus, the terminals 40a, 40c may be connected in series with the normally open switch 33, a power supply shown as a battery 140, and a tape end display 142 which may comprise an indicator lamp. The terminals 40a, 40b are connected in series with the switch 33, the power supply 140 and a tape end warning device 143. In the upper position of the switch knob 40' as shown in FIG. 3, the tape end display 142 connected in series with the terminals 40a, 40c and the switch 33 is illuminated while in the lower position of the switch knob 40', the connection between the terminals 40a, 40b is completed to activate the tape end warning device, which is connected in series with these terminals and switch 33. When a record/playback operation is interrupted under the condition shown in FIG. 3, a downward movement of the sliding plate 34 causes the actuating member 34" to move downward also, forcing the knob 40' of the switch 40 downward. Thereupon the connection between the terminals 40a, 40c is interrupted while the connection between the terminals 40a, 40b is completed, activating the tape end warning device 143. In this manner, by vertically moving the switch knob 40' externally, the tape end detector may be selectively connected with the warning device or the display in a simple manner.

Figure 4:
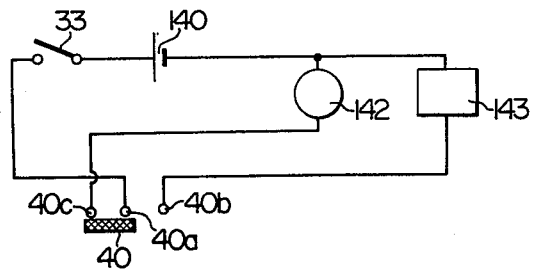
FIGS. 4 and 5 are circuit diagrams of electrical circuits which are applicable to the tape end detection release device of FIG. 3.
Figure 5:
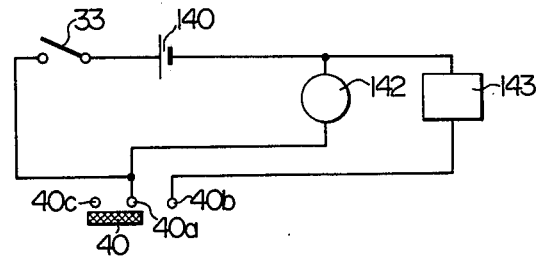

FIG. 5 is a circuit diagram of a modification of FIG. 4. In FIG. 5, the switch 33, the power supply 140 and the tape end display 142 complete a circuit regardless of the position of the switch 40, and when a tape end is reached to close the switch 33, the tape end display 142 is always illuminated. If the switch 40 is in a position to connect across the terminals 40a, 40c, the tape end warning device 143 is not activated. If the connection between the terminals 40a, 40b is completed, the tape end warning device 143 is activated upon closure of the switch 33 when a tape end is reached. In this instance, the tape end display is also illuminated. Thus with the electrical circuit of FIG. 5, the tape end display is illuminated whenever the switch 33 is closed, while the tape end warning device is activated when the terminals 40a, 40b are interconnected or when the knob 40' of FIG. 3 has moved downward. The circuit shown in FIGS. 4 and 5 may be selectively used as desired.

Figure 6:
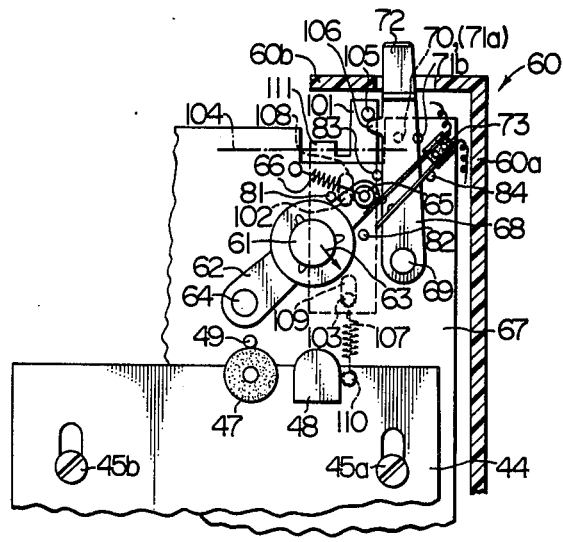
FIG. 6 is a plan view, partly in section, of a tape end detection release device constructed according to a further embodiment of the invention which is assembled into a cassette tape recorder playing a microcassette shown in FIG. 1.
Figure 7:
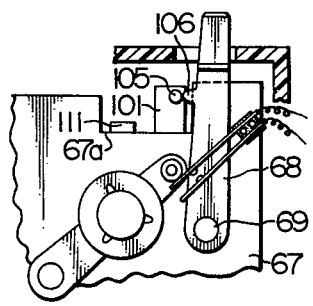
FIG. 7 is an enlarged fragmentary plan view, partly in section, of the tape recorder shown in FIG. 6 when a tape cassette is removed therefrom.

Referring to FIGS. 6 and 7, an embodiment will be described in which the release device for the tape end detection is activated in response to the loading or removal of a cassette onto a cassette tape recorder which plays a microcassette. In FIG. 6, a tape recorder 60 includes a chassis 67 on which a shaft 64 is fixedly mounted. A hub lever 62 has its one end rotatably mounted on the shaft 64, and carries a pin, not shown, intermediate its length, on which a tape hub shaft 61 is fitted using a well known slip mechanism. A switch actuating member 65 in the form of a short sleeve is secured to the free end of the lever 62. The lever 62 is biased to rotate counter-clockwise by a spring 66 extending between the free end of lever and a stationary pin 49, but the resulting rotation is limited by abutment against a stop pin 81. The rotation of the lever in the clockwise direction is also limited by a stop pin 82. A normally open switch 73 is spaced lengthwise from the lever 62 and has the free end of its movable contact disposed adjacent to the actuating member 65.

In accordance with the invention, a tape end detection release lever 68 is located to the right of the lever 62 and has its lower end rotatably mounted on a stationary shaft 69, the release lever 68 extending generally parallel to the right-hand sidewall 60a of the recorder 60. The upper end of the release lever 68 extends externally of the upper sidewall 60b of the recorder 60 to provide a trigger end 72 for turning the lever 68. A nipple 70 extends from the back surface of the lever 68 at a position spaced from the trigger end 72 for selective engagement with dimples 71a, 71b formed in the chassis 67, thereby providing a click stop operation of the lever 68. In order to secure a click stop operation of the lever 68, a pair of stop pins 83, 84 are fixedly mounted on the chassis 67 for limiting the rotation of the lever 68. Adjacent to the upper end and on the left-hand side edge, the lever 68 is formed with a projection 106 which is located so as to cooperate with an actuating pin 105 to be described later.

In accordance with the invention, a reset lever 101 is mounted on the rear surface of the chassis 67 for resetting the release lever. The reset lever 101 is disposed in parallel relationship with the chassis 67 on the opposite side from the release lever 68 and is located such that the right-hand lateral side of the reset lever 101 is substantially in alignment with the left-hand lateral edge of the release lever 68 when the nipple 70 engages the dimple 71a or when the tape end detection is released. The reset lever 101 is formed with elongate slots 108, 109 engaged by guide pins 102, 103 which are fixedly mounted on the rear surface of the chassis 67 making the lever 101 slidable in the vertical direction as permitted by the engagement between these slots and the pins. A spring 107 extends between the lower end of the reset lever 101 and an anchoring pin 110 mounted on the rear surface of the chassis 67 for urging the reset lever 101 to move downward.

A phantom line 104 indicates the upper or inner edge of a tape cassette (see FIG. 2) which is loaded on the tape recorder. The upper portion of the reset lever 101 is forked with the left-hand limb being bent perpendicularly in an upward direction, namely in a direction coming out of the sheet of drawing to provide a hook 111 adapted to engage the inner edge of the tape cassette. The downward movement of the reset lever 101 under the bias of the spring 107 is limited by the engagement of the hook with the inner edge 104 of the cassette. The actuating pin 105 is fixedly mounted on the upper end of the right-hand limb and extends in a direction to come out of the sheet of drawing. As the reset lever 101 moves downward, the actuating pin 105 comes into contact with the upper inclined surface of the projection 106, to drive it during a further downward movement thereof, thereby forcing the release lever 68 to the right until the nipple 70 engages the dimple 71b by a click stop operation.

A sliding plate 44 carries a magnetic head 48 and a pinch roller 47 which cooperates with the capstan 49, and is formed with a pair of vertically extending elongate guide slots along its opposite sides, which are engaged by stationary pins 45a, 45b so as to make the plate 44 slidable in the vertical direction. In FIG. 6, an external operation has caused the sliding plate 44 to move to its upper position in which a record/playback operation is possible.

FIG. 6 shows a condition in which a tape cassette is loaded on the tape recorder and the release lever 68 is maintained in its left-hand position by an operation of the trigger end 72, thus disabling a tape end detecting operation. Specifically, the left-hand edge of the lever 68 bears against the stop pin 83, and the nipple 70 engages the dimple 71a by a click stop operation. When a tape end is reached under this condition, the tension in the tape causes the tape hub shaft 61 to be pulled in the direction of arrow 63, whereby the lever 62 slightly rotates about the shaft 64 in the same direction. However, the right-hand edge of the free end of the lever 62 bears against the left-hand edge of the lever 68, so that a further rotation thereof is prevented. Consequently, the switch actuating member 65 mounted on the free end of the lever 62 cannot move to press against the movable contact of the switch 73, which therefore remains open and the warning device (not shown) remains inoperative. In this manner, a tape end detection is released.

When it is desired to perform a tape end detection, the trigger end 72 may be operated to rotate the lever 68 clockwise. When a tape end is reached subsequently, the lever 62 can rotate clockwise without abutment against the left-hand edge of the lever 68, so that the switch actuating member 65 is free to press against the movable contact of the switch 73 until the latter is closed. Thus, the apparatus is reset to a condition in which the tape end detector is operable.

Since the tape end detection is released so long as the lever 68 is maintained in its release position, there may result an inconvenience that a warning cannot be given off when it is desired during a recording operation as a result of inadvertently maintaining the release lever 68 in its release position. In accordance with the invention, an arrangement is made such that the lever 68 is automatically reset to its inoperative position in conjunction with the loading or removal of a tape cassette from the tape recorder. Specifically, when the tape cassette is removed from the tape recorder 60 shown in FIG. 6 for purpose of replacement or inversion, the hook 111 which has been held locked by the inner or rear surface of the tape cassette is released, whereby the reset lever 101 becomes free to move downward under the tension of the spring 107. At this time, the reset lever 101 moves downward along the left-hand edge of the release lever 68, and the actuating pin 105 fixedly mounted on the reset lever 101 bears against the upper inclined surface of the projection 106 on the left-hand edge of the release lever 68. During a further downward movement the actuating pin 105 exerts a force upon the projection 106 which causes it to move to the right, thereby turning the lever 68 clockwise about the shaft 69. The nipple 70 on the lever 68 is disengaged from the dimple 71a in the chassis 67 and moves into engagement with the other dimple 71b, where it comes to a stop by a click stop operation. Under this condition, the release lever 68 is in its reset position, so that when a tape end is reached during a subsequent operation of the tape recorder, the lever 62 becomes able to rotate clockwise so that the switch actuating member 65 secured to the free end thereof presses against the movable contact of the switch 63 to close the latter.

FIG. 7 shows in plan view the relative position of the reset lever 101 and the release lever 68 when the tape cassette is removed. As mentioned previously, the removal of the tape cassette from the tape recorder frees the hook 111 on the reset lever 101, whereby the reset lever 101 moves downward under the resilience of the spring 107 as shown in FIG. 6, and the hook 111 bears against a notch 67a formed in the upper edge of the chassis 67 where it comes to a stop. At this time, the actuating pin 105 on the lever 68 moves along the upper inclined surface of the projection 106, thereby moving the lever 68 to the right. As a result, the lever 68 rotates clockwise about the shaft 69. Under this condition which is shown in FIG. 7, the projection 106 is maintained in abutment against the actuating pin 105, so that the release lever 68 cannot be operated toward its release position.

Figure 8A:
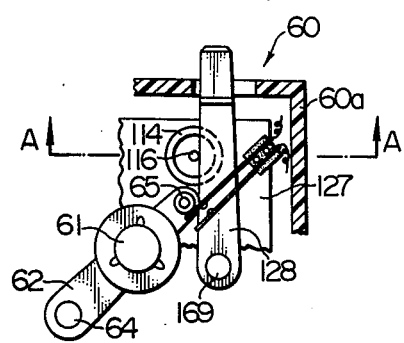
FIGS. 8(a) and (b) respectively show a plan view and a cross section of a tape end detection release device according to an additional embodimemt of the invention, as assembled into a cassette tape recorder.
Figure 8B:
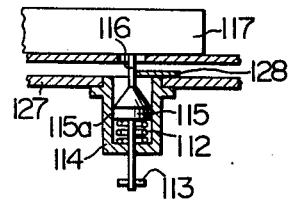

Another embodiment will now be described in which a tape end detection release device is operated in conjunction with the loading or removal of a microcassette from a cassette tape recorder. FIG. 8(a) is a plan view of an embodiment of an apparatus for releasing or resetting the operation of a tape end detector by utilizing the lower surface of the microcassette to drive or release a reset shaft. FIG. 8(b) is a cross section taken along the line A—A shown in FIG. 8(a). Parts corresponding to those shown in FIGS. 6 and 7 are designated by like numerals and will not be described. In FIG. 8(a) a tape end detection release lever 128 has its lower end rotatably mounted on a stationary shaft 169 which is fixedly mounted on a chassis 127 and extends in parallel relationship with the right-hand sidewall 60a of the tape recorder 60 at a position to the right of the hub lever 62. The extent of the angular movement of the lever 128 is limited by the engagement between the nipple and dimples which provide a click stop operation. When it is turned to the left, it assumes a release position while it assumes a reset position when it is turned to the right.

In accordance with the invention, a reset shaft 116 functions to reset a tape end detector from its released condition to its reset or operable condition. Referring to FIG. 8(a), a through hole is formed in the chassis 127 which has its center substantially aligned with the left-hand edge of a release lever 128 in the central portion thereof when it assumes a release position. As shown in FIG. 8(b), a cup-shaped cylindrical casing 114 is fitted into the through opening from the bottom side of the chassis 127. The reset shaft 116 is nestingly received in the cylindrical casing 114 and has a circular flange 115 having a cone-shaped top. The shaft 116 is adapted to move vertically by the action of the flange 115 which fits in the casing 114. A coiled spring 112 is disposed on the reset shaft 116 between the flange 115 and the bottom of the casing, urging the reset shaft 116 upward. The lower end of the reset shaft 116 extends through the bottom wall of the cylindrical casing and has a locking ring 113 secured thereto, which serves to limit the upward movement of the reset shaft 116 by abutment against the bottom of the casing.

Describing the operation, it is to be noted that both FIGS. 8(a) and (b) show a condition in which a microcassette 117 is loaded on the tape recorder, and the tape end detection is released. Thus, the release lever 128 is turned to its left-hand position, with its left-hand edge bearing against the top portion of the reset shaft 116. When the cassette 117 is removed under this condition, the reset shaft 116 becomes free to move upward under the resilience of the spring 112. As the reset shaft 116 rises, the left-hand edge of the release lever 128 is gradually driven to the right by the conical surface on the top of flange 115, and comes to a stop when it bears against the cylindrical surface 115a of the flange 115. The position assumed by the release lever 128 at this time represents a reset position thereof. In other words, the removal of the microcassette resets the release of the tape end detection. Since the release lever 128 is maintained in abutment against the flange 115 at this time, it cannot be operated to move toward its released position. It will be appreciated that the reset shaft 116 may be utilized for removal of the cassette by manually pushing it upward, as viewed in FIG. 8(b) to remove the cassette from its loaded position, while simultaneously moving the release lever 128 to its reset position. In this instance, the spring 112 will be replaced by a tension spring, thereby biasing the reset shaft in the opposite direction from the arrangement shown in FIGS. 8(a) and (b).

Again the tape end detector is reset to its operable condition in conjunction with the loading or removal of the tape cassette, and release lever 128 is returned to its reset position when the tape cassette is not loaded.

Figure 9:
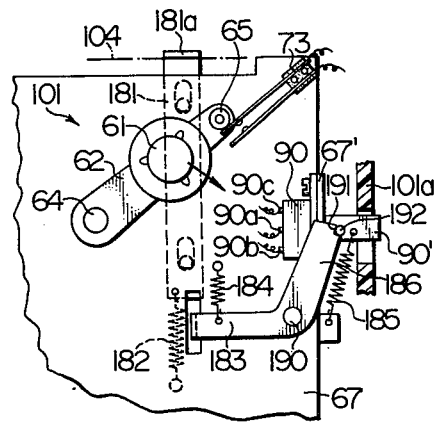
FIG. 9 is a plan view, partly in section, of a tape end detection release device according to yet another embodiment of the invention, as assembled into a cassette tape recorder.

FIG. 9 shows a further embodiment of a release apparatus for use in a cassette tape recorder playing a microcassette in which the release device is operated through a switch of a sliding type in conjunction with the loading or removal of the microcassette. The function achieved is quite similar to that of the preceding embodiments shown in FIGS. 6 and 8. Therefore, parts corresponding to those shown in FIGS. 6 and 8 will be designated by like numerals and will not be described. Referring to FIG. 9, there is shown a tape recorder 101 having a chassis 67 on which a shaft 64 is fixedly mounted. A hub lever 62 has its one end rotatably mounted on the shaft 64 and fixedly carries a shaft (not shown) on which a tape hub shaft 61 is fitted using a well known slip mechanism. A switch actuating member 65 in the form of a short sleeve is secured to the free end of the lever 62. A normally open switch 73 has its movable contact extending to a position adjacent to the actuating member 65. A switch mount 67' is formed by folding, upwardly from the sheet of drawing, from the right-hand end of the chassis 67, and a switch 90 of a sliding type is mounted thereon. The switch 90 includes a knob 90', which extends through the right-hand side wall 101a of the recorder 101 so as to be movable vertically, as viewed in this Figure, by an external operation for switching purpose. The switch 90 is provided with three terminals 90a, 90b, 90c. The terminals 90a, 90c are connected in series with the normally open switch 73, a tape end display (not shown) and a power supply (not shown), while the terminals 90a, 90b are connected in series with the normally open switch 73, a tape end warning device (not shown) and the same power supply.

A phantom line 104 indicates the inner or rear surface of the microcassette. In accordance with the invention, a reset lever 181 is mounted on the back surface of the chassis 67 so as to be slidable in the vertical direction by having elongate guide slots formed therein which are engaged by pins fixedly mounted on the chassis 67, in the same manner as mentioned previously. The top end of the reset lever 181 is bent at right angles to extend upwardly from the sheet of drawing to form a hook, which engages the inner or rear surface of the loaded microcassette. A spring 182 extends between the lower end of the reset lever 181 and a pin fixedly mounted on the chassis 67, thus urging it to move downward.

An interlocking lever 183 is L-shaped having a bend centrally, where it is rotatably mounted on a shaft 190 which is fixedly mounted on the chassis 67. The lever 183 has one arm extending to the right and upwardly, the free end of which is notched to provide a shoulder on its right-hand side to form a hook 191 for abutment against a pin 192 fixedly mounted on the knob 90'. The lever 183 has another arm which extends horizontally and to the left, the free end of which is bent at right angles to extend toward the backside of the sheet of drawing, extending through a rectangular slot formed in the chassis 67 to the backside thereof for abutment against the lower end face of the reset lever 181.

The described apparatus operates as follows: The operation which occurs when a tape end is reached during an operation of the tape recorder 101 is quite similar to that achieved in the arrangement of FIG. 6. Specifically, when the operation of the tape recorder 101 is terminated and the microcassette is removed, the hook 181a at the upper end of the reset lever 181 is disengaged from the rear surface of the cassette, whereby it moves downward under the resilience of the spring 182. The lower end of the reset lever 181 abuts against a lateral end face of the interlocking lever 183 which projects on the backside of the chassis 67, thereby driving it downward. Thereupon, the lever 183 rotates counterclockwise about the shaft 190, disengaging the hook 191 of the lever 183 from the pin 192 on the knob 90'. Thereupon, the knob 90' is pulled down by the resilience of spring 185, interrupting the electrical connection between the terminals 90a, 90c and completing a connection between the terminals 90a, 90b. In this manner, the removal of the cassette from the tape recorder causes a downward movement of the knob 90' of the switch 90, restoring the operable condition of a tape end warning device in a manner similar to that of the embodiment shown in FIG. 3.

Figure 10:
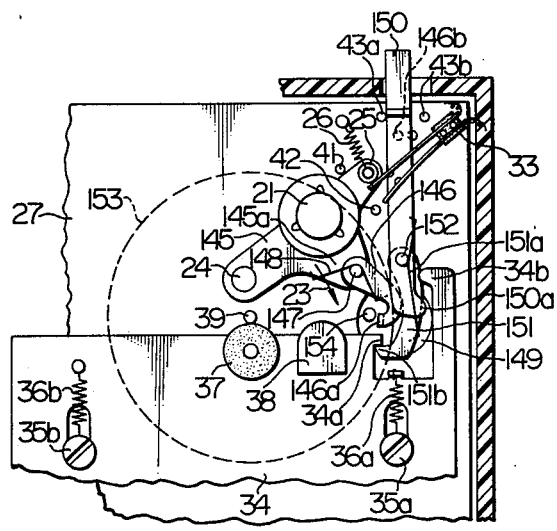
FIG. 10 is a plan view, partly in section, of a tape end detection release device according to a still further embodiment of the invention which is assembled into a cassette tape recorder playing a microcassette and having an auto "shut-off" device.

FIG. 10 shows another embodiment of the invention applied to a tape recorder which plays a microcassette and which is provided with an auto "shut-off" device. Except for the parts which are associated with the auto shut-off device, the construction of the tape end detector is substantially similar to that shown in FIG. 2, and therefore corresponding parts are designated by like numerals without repeating their description.

Referring to FIG. 10, a shaft 24 is fixedly mounted on a chassis 27, and a hub lever 145 has its one end rotatably mounted on the shaft 24. Intermediate its length, the lever 145 fixedly carries a shaft (not shown) on which a hub shaft 21 is rotatably fitted. A switch actuating member 25 is mounted on the free end of the lever 145 for pressing against a movable contact of a normally open switch 33 to close it. The lever 145 includes an arm 145a extending to the right from a central portion thereof. A shaft 147 is fixedly mounted on the arm 145a, and an operating lever 146 has its one end rotatably mounted on the shaft 147 and is biased to rotate counter-clockwise by a spring 148 of a reduced resilience which is disposed on the shaft 147. The operating lever 146 is J-shaped in configuration, and its free end is bent at right angles so as to extend to the backside of the chassis 27, extending through a circular opening 149 formed in the chassis 27 to provide a depending portion 146a which projects toward the backside of the chassis 27.

A claw lever 151 is disposed toward the lower end of a tape end detection release lever 150 and is rotatably mounted on the same shaft 152 as the lever 150. The claw lever 151 is disposed in overlapping relationship with the lever 150 and disposed on its side nearer the chassis 27. The claw lever 151 is biased to rotate clockwise by a spring 151a. The lower end of the claw lever 151 is formed as a hook 151b which engages a tab 34a extending from a sliding plate 34. The operating lever 146 is interposed between the levers 150, 151. The lower end of the lever 150 extends to the right to form an ear 150a for engagement with a release lever pusher 34b which is formed at the free end of an upward extension provided along the right-hand end of the sliding plate 34, in a manner generally similar to the arrangement of FIG. 2. A flywheel 153 indicated in broken lines is disposed below the chassis 27 or on the backside thereof, and fixedly carries a pin 154.

Describing the operation of the apparatus described, FIG. 10 shows a condition of the tape recorder during its recording operation. The tape end detection is released by maintaining the release lever 150 in its release position. Therefore, when a tape end is reached and the lever 145 rotates in the direction of arrow 23 as a result of the tape tension, the free end thereof bears against the lateral edge of the lever 150, whereby its further rotation is prevented. When the release lever 150 is turned clockwise about the shaft 152 to enable the tape end detection, the movement of the free end of the release lever 150 to its right-hand position permits the hub lever 145 to rotate until it bears against a stop pin 42 as the lever 145 is pulled by the tape tension in the direction of arrow 23. The rotation of the hub lever 145 permits the switch actuating member 25 to press against the movable contact of the switch 33 to close it, thereby activating a warning device (not shown). At the same time, the operating lever 146 mounted on the arm 145a of the hub lever 145 moves in the direction of arrow 23, whereby the depending portion 146a at the free end thereof rotates clockwise against the spring 148 while its right-hand edge slides along the left-hand edge of the claw lever 151. As the depending portion 146a moves into a path of rotation of the pin 154 on the flywheel 153 during such rotation, it is expelled back by the rotating pin 154, whereby the claw lever 151 which maintains abutment against the depending portion 146a is also expelled, turning counter-clockwise against the force of spring 151a to disengage the hook 151b from projection 34a of the sliding plate 34. As a result, the sliding plate 34 which has been locked in place by the hook 151b becomes free to move downward under the resilience of springs 36a, 36b until a stop position is reached, thereby automatically interrupting a record/playback operation. In this manner, the described apparatus achieves the intended purpose when combined with an auto shut-off device. At this time, the operation of pusher 34b on the sliding plate 34 is similar to that of pusher 34' shown and described in connection with FIG. 2.

Figure 11:
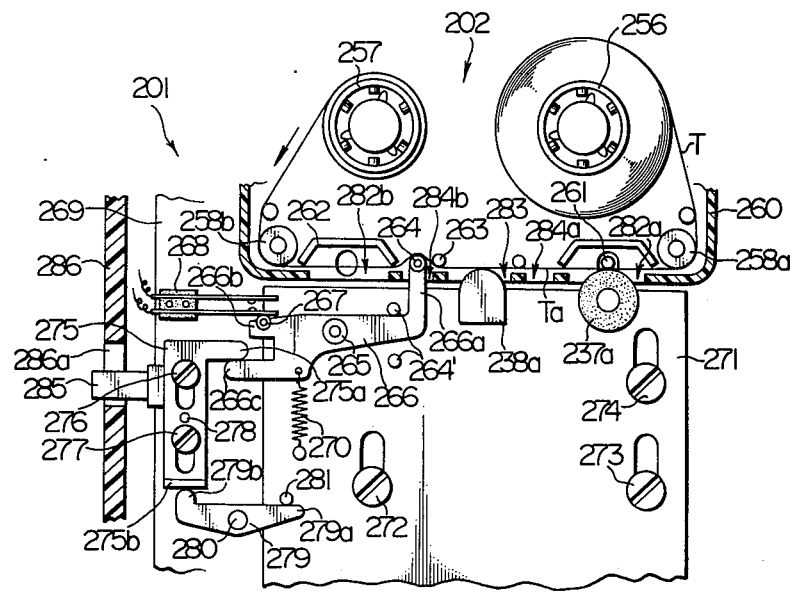
FIG. 11 is a plan view, partly in section, of a tape end detection release device according to one embodiment of the invention which is assembled into a cassette tape recorder playing a compact cassette.

While the invention has been described as applied to a tape recorder which plays a microcassette, it is equally applicable to a tape recorder which plays a compact cassette. FIG. 11 is a plan view of a tape recorder during its recording operation when a compact cassette is loaded thereon, illustrating another embodiment of the invention. In FIG. 11, a compact cassette 202 has a known construction. Specifically, a pair of tape hubs 256, 257 are rotatably disposed therein. A length of magnetic tape T has its one end anchored to one tape hub 256 and wound thereon and is subsequently passed around a pair of guide rollers 258a, 258b so as to extend along and inwardly of slot windows 282a, 282b, 283, 284a, 284b formed in the front face of the cassette, the tape being maintained in taut condition before being wound on the other tape hub 257, to which the other end of the tape is anchored. The central window 283 admits a magnetic head while immediately adjacent windows 284b, 284a are openings which are not utilized in the normal tape recorder but which selectively admit a contact lever 266a to be described later. The furthermost windows 282b, 282a admit an erase head and a pinch roller, respectively. A running of a tape portion Ta which extends along the slot windows takes place by the rotation of a capstan 261 which cooperates with a pinch roller 237a to hold the tape portion Ta therebetween while the back surface of the tape bears against guide members 262 and guide pins 263 internally provided within the cassette 202. A record/playback operation takes place by a magnetic head 238a and/or erase head (not shown). According to the invention, a tape end detector utilizes the slot window 284b which admits the contact lever 266a. Specifically, a tape end detecting lever extends into the window 284b to engage the tape portion Ta extending between the guide members 262, 263 to cause flexing of the tape. As a tape end is reached, the tension in the tape causes the flexing to be removed, converting it into a rectilinear condition.

A tape end detecting member is formed by the contact lever 266, which has its central portion rotatably mounted on a shaft 265 fixedly mounted on a sliding plate 271. The lever 266 includes one arm 266a which initially extends to the right and is then bent to extend upwardly, with a contacting element 264 mounted on the free end thereof so as to extend into the slot window 284b for contact with the tape portion Ta. The lever 266 includes another arm which is forked, including an upper arm 266b on which a switch actuating member 267a in the form of a short sleeve of an insulating material is secured and a lower arm which extends horizontally and to the left to form a mating portion 266c which is adapted to engage a tape end detection release member to be described later. The switch actuating member 267 is located adjacent to the free end of a movable contact of a normally open switch 268 which is mounted on the chassis 269 of the tape recorder 201, and serves to close the switch 268 by pressing against the movable contact as the sliding plate 271 moves upward. The contact lever 266 is biased to rotate counter-clockwise by a spring 270 which extends between the arm 266c and a stationary pin, but the resulting rotation is limited by the lower one of stationary pins 264'. The sliding plate 271 fixedly carries a record/playback head 238a and a pinch roller 237a, and is slidable in the vertical direction, as viewed in this Figure, by providing vertically extending elongated guide slots therein adjacent to its opposite lateral edges which slots are engaged by stationary pins 272, 273, 274.

The tape end detection release apparatus essentially comprises a release lever 275 which is adapted to slide as a knob 285 is externally operated, and a reset lever 279 which is interlocked with the sliding movement of the lever 275. The release lever 275 is formed by a rectangular plate of a metal or a plastic material which is formed with a pair of spaced, vertically extending elongated slots therein engaged by pins 276, 277 fixedly mounted on the chassis 269 adjacent to the left-hand sidewall of the tape recorder 201. In this manner, the release lever 275 is made slidable in the vertical direction, as viewed in this Figure. The upper end of the release lever 275 extends to the right to form a detent 275a which is located opposite to the mating portion 266c of the contact lever 266. The lower end of the release lever 275 is bent at a right angle so as to extend upwardly from the sheet of drawing to provide a mating portion 275b which is located opposite to a pusher 279b formed at one end of the reset lever 279. The release lever 275 is centrally embossed with a nipple 278 which projects to the backside thereof, the nipple 278 being adapted to engage dimples (not shown) formed in the chassis 269 at positions corresponding to the upper and lower positions of the release lever 275, thus providing a click stop operation for the release lever 275.

The knob 285 is secured to the left-hand side of the release lever 275, and extends through a vertically elongated slot 286a formed in the sidewall 286 of the tape recorder so as to project externally thereof. The reset lever 279 has its central portion rotatably mounted on a shaft 280 which is fixedly mounted on the chassis 269. The reset lever 279 includes one arm, the free end of which is formed as the pusher 279b mentioned above, and also includes another arm, the free end of which forms a mating portion 279a which is located below a pin 281 fixedly mounted on the sliding plate 271 and which is forced downward as the pin 281 moves downward.

FIG. 11 shows a condition of the tape recorder when the knob 285 is externally operated to place the release lever 275 in its lower position or release position while the sliding plate 271 assumes its upper position to enable a record/playback operation of the tape recorder 201. When a terminal end of the running tape T is reached to terminate a tape feeding from the tape hub 257 under this condition, the continued feeding operation by the capstan 261 and the pinch roller 237 causes an increase in the tape tension, and the tape portion Ta which has been flexed by the contacting element 264 tends to force the element 264 downward against the bias applied by the spring 270. However, the contact lever 266 is kept from rotating because the mating portion 266c at the other end of the contact lever 266 is locked by the detent 275a of the release lever 275, thus preventing a downward movement of the contacting element 264.

As a consequence, the switch actuating member 267 on the end 266b of the contact lever 266 does not move, precluding a closure of the switch 268 and hence an operation of a warning device (not shown). Thus, the tape end detection is released. To stop a record/playback operation under this condition, an external operation causes the sliding plate 271 to move downward. As the sliding plate 271 moves downward, the pin 281 fixedly mounted thereon also moves in the same direction to bear against the mating portion 279a of the reset lever 279 to move it downward. Thereupon, the opposite end or pusher 279b of the lever 279 is raised, pressing against the mating portion 275b of the release lever 275, thus moving the lever 275 to its upper position in which the tape end detection is enabled or the release apparatus is reset. Consequently, if the sliding plate 271 is then moved upward to perform a record/playback operation of the tape recorder, the contact lever 266 can rotate without its mating portion 266c being locked by the detent 275a of the release lever 275 since the latter has moved upward when the tape end is reached. As a consequence, the switch actuating member 267 moves upward to close the switch 268, detecting that the tape end is reached, and hence activating a warning device (not shown). In this manner, an interruption of a record/playback operation automatically resets the release device so as to enable a tape end detection.

Figure 12:
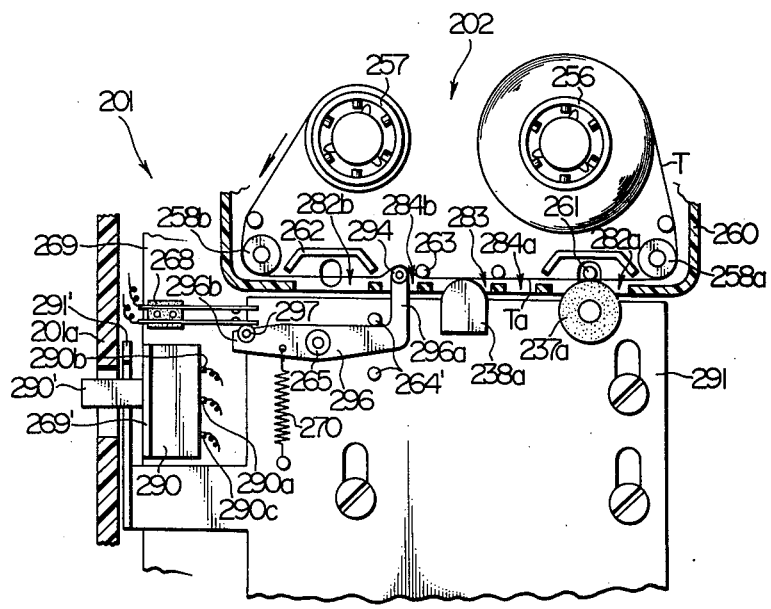
FIG. 12 is a plan view, partly in section, of a tape end detection release device according to a further embodiment of the invention which is assembled into a cassette tape recorder playing a compact cassette.

FIG. 12 shows a modification of the embodiment of FIG. 11 in which the release lever 275 is replaced by a switch 290 of a sliding type. The contact lever 266 shown in FIG. 11 is replaced by a contact lever 296, and the sliding plate 291 is provided with a pusher 291' which corresponds to the pusher 34" shown in FIG. 3. In other respects, the arrangement is similar to that of FIG. 11. Therefore, corresponding parts are designated by like numerals and will not be described.

In the embodiment of FIG. 12, when an operating knob 290' which extends from the switch 290 to the exterior of the cassette is set in its upper position, an electrical connection between switch terminals 290a, 290b is interrupted to disconnect an electrical circuit of a warning device (not shown) which comprises a tape end detecting switch 268 connected in series with these switch terminals. Thus, a warning operation does not take place when the detecting switch 268 is closed.

When the switch 290 is set in its position in which it releases the tape end detection, a downward movement of the sliding plate 291 as a record/playback operation is interrupted causes switch actuator 291' to press against and drive the knob 290' downward. The switch actuator 291' is formed as an integral part of the sliding plate 291. Specifically, part of the sliding plate 291 is extended to the left and bent at right angles to provide an upright portion, which is then extended upwardly to a position which is located above the knob 290', the switch actuator 291' being formed as a hook thereon. As the knob 290' is moved downward, an electrical connection between the switch terminals 290a, 290b is completed, thus resuming a reset position.

Under this condition, the contacting element 294 is forced down by the tape tension as a tape end is reached, whereby the contact lever 296 rotates clockwise to cause switch actuator 297 to press against the movable contact of the switch 268, thus closing it to achieve the detection of a terminal end of the running tape. It will thus be seen that when the tape end detection is released by manually operating the switch 290, the establishment of a record/playback operation after it has once been interrupted automatically resets the release device and enables a tape end detection.

Figure 13:
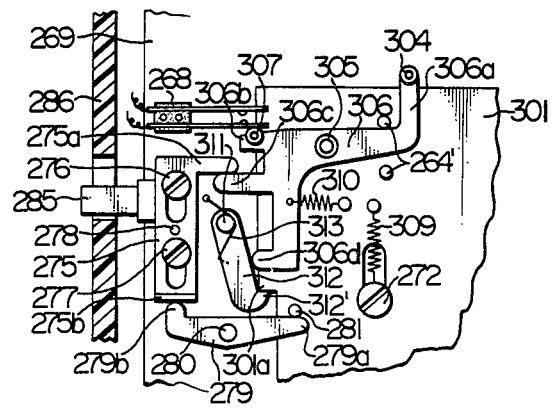
FIG. 13 is a plan view, partly in section, of a tape end detection release device according to still another embodiment of the invention which is assembled into a cassette tape recorder playing a compact cassette.

FIG. 13 is a plan view of another embodiment of the invention as applied to a tape recorder which plays a compact cassette and which is provided with an auto "shut-off" device. Parts corresponding to those shown in FIG. 11 are designated by like reference characters and hence will not be described.

Referring to FIG. 13, a cradle or contact lever 306 has its central portion rotatably mounted on a shaft 305 which is fixedly mounted on a sliding plate 301. The contact lever 306 includes one arm 306a which extends to the right and then vertically upward, with its free end being provided with a contacting element 304. The cradle includes three other arms, and the uppermost arm 306b carries a switch actuator 307 in the form of a short sleeve of an insulating material. The switch actuator 307 is located adjacent to the free end of the movable contact of the switch 268. The central arm 306c extends horizontally to the left to provide a mating portion which is located adjacent to a detent 275a formed at the upper end of the release lever 275. The detent 275a functions to block a clockwise rotation of the contact lever 306. The lowermost arm extends vertically downward to provide a pusher 306d. The contact lever 306 is biased to rotate counter-clockwise about the shaft 305 by a spring 310 which extends between the lowermost arm and a stationary pin, but the resulting rotation is limited by abutment against the upper one of the stop pins 264'. The release lever 275 and the reset lever 279 are constructed in the same manner as described above in connection with FIG. 11, and therefore will not be described again.

An operating lever 312 has its one end rotatably mounted on a shaft 311 which is fixedly mounted on the chassis 269, and the other end of the operating lever is formed with a hook 312' which is adapted to engage a mating portion 312' of a sliding plate 301 to prevent its downward movement. The operating lever 312 is biased to rotate counter-clockwise by a spring 313 which is disposed on the shaft 311 and has its one end anchored to a stationary pin and its other end engaged with the right-hand edge of the lever 312, but the resulting rotation is limited by its abutment against pusher 306d of the contact lever 306.

FIG. 13 shows the release lever 275 in its lower position where the tape end detection is released. With the lever 275 in this position, when a terminal end of the running tape is reached and the tension in the tape causes the contacting element 304 to be forced downward, the abutment of the mating portion 306c of the contact lever 306 against the detent 275a prevents a rotation of the contact lever 306, thus preventing a tape end detection. In this instance, the sliding plate 301 is returned to its stop position under the tension of a spring 309 extending between the sliding plate and a stationary pin 272, by disengaging the hook 312' from the mating portion 301a of the sliding plate by an external operation of a stop actuating member (not shown).

When a record/playback operation is interrupted and the sliding plate 301 moves downward, the pin 281 fixedly mounted on the sliding plate 301 drives the mating portion 279a of the reset lever 279, causing it to rotate clockwise. Thereupon, the pusher 279b moves upward to raise the mating portion 275b of the release lever 275, causing it to move upward. As the release lever 275 moves upward into its upper or release position, the detent 275a also moves in the same direction to unlock the contact lever 306, which becomes free to rotate so as to be able to provide a tape end detection. Thus when the release lever 275 is manually operated to its release position, an interruption of a record/playback operation to bring the tape recorder to its stop condition automatically resets the release lever 275.

Describing now the auto shut-off operation when the release lever 275 assumes its release or upper position, as the tape end is reached, the contacting element 304 is forced down by the tape tension, whereby the contact lever 306 rotates clockwise without being constrained by the detent 275a of the release lever 275, with the switch actuator 307 pressing against the movable contact of the switch 268 to close it. In this manner, the tape end is detected and a warning device (not shown) is activated. Simultaneously, the pusher 306d of the contact lever 306 bears against the lateral edge of the operating lever 312 to cause it to rotate clockwise, whereby the hook 312' is disengaged from the mating portion 301a of the sliding plate 301. Thus the sliding plate 301 is free to move downward under the bias applied by the spring 309, moving from a record/playback position to its stop position. It will be appreciated that where the tape tension alone is insufficient to cause a rotation of the contact lever 306, a rotational energy as supplied by the flywheel mentioned in connection with FIG. 10 may be utilized to assist in causing the rotation of the contact lever 306.

In this manner, when a tape end is reached, this is detected to activate a warning device (not shown) and a record/playback operation is automatically interrupted, thus achieving a so-called auto "shut-off" function. As in the previous embodiments, if the release lever is set in a position in which it prevents a tape end detection, the release lever is automatically reset to a position in which it does not prevent a tape end detection when a record/playback actuating member is reset. In the embodiment described above, a warning device which is activated by the switch 268 has been included, but such switch may be eliminated, leaving only the auto shut-off function.

Figure 14:
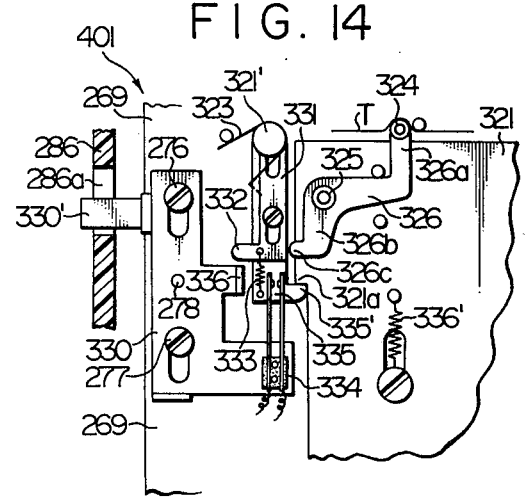
FIG. 14 is a plan view, partly in section, of a tape end detector according to the invention as assembled into a cassette tape recorder playing a compact cassette.

FIG. 14 is a plan view of a further embodiment of the invention which is applied to a tape recorder playing a compact cassette and provided with an auto "shut-off" device for releasing a tape end warning through the auto shut-off and switching to a tape end display. Parts corresponding to those shown in FIG. 11 are designated by like reference characters and will not be described.

In FIG. 14, a contact lever 326 has its central portion rotatably mounted on a shaft 325 which is fixedly on a sliding plate 321. The lever 326 includes one arm 326a which extends to the right and then in the upward direction, with a contacting element 324 mounted at the free end thereof for contact with the tape T. The lever also includes another arm 326b which extends to the left and downwardly, with its free end providing a projection 326c for cooperation with the right-hand edge of a sliding piece 331 mounted on the left-hand portion of the sliding plate 321. A shaft 321' is fixedly mounted on the chassis 269, and a claw lever 335 has its one end rotatably mounted on the shaft 321. The free end of the claw lever 335 is formed with a hook 335' which is engageable with a mating portion 321a of the sliding plate 321 to prevent its downward movement. The claw lever 335 is biased to rotate counter-clockwise by a spring 323 disposed on the shaft 321' and having its one end anchored to a stationary pin and its other end engaging the left-hand edge of the claw lever 335, but the resulting rotation of the lever 355 is limited by its abutment against the left-hand edge of the sliding plate 321.

The sliding piece 331 is aligned with and spaced above the claw lever 335, and is formed with a pair of elongate guide slots which are engaged by the shaft 321' and a pin fixedly mounted on the claw lever 335. The sliding piece is urged to move downward by a spring 333 which extends between the lower end of the sliding piece 331 and a pin fixedly mounted on the lower portion of the claw lever 335. The lower end of the sliding piece 331 extends to the left to form a mating portion 332 which is located for cooperation with an upright piece 336 extending from a release lever 330.

The release lever 330 is formed with a pair of vertically aligned, vertically extending elongated guide slots, which are engaged by pins 276, 277 fixedly mounted on the chassis 269 adjacent to the left-hand sidewall of a tape recorder 401 so as to make the lever 330 slidable in the vertical direction. The release lever 330 is centrally formed with a nipple 278 which is embossed to project to the backside thereof, the nipple 278 being engageable with dimples formed in the chassis 269 to provide a click stop operation. The lower end of the release lever 330 extends to the right, with a normally open switch 334 disposed on the free end thereof. The switch 334 includes a movable contact which extends in the upward direction, with the free end of the movable contact being located such that it is positioned adjacent to the projection 326c of the contact lever 326 when the release lever 330 has moved to its upper position. The switch 334 is connected in an electrical circuit with a tape end display, not shown. The release lever 330 is centrally formed with an extension which extends to the right, with the free end of the extension being bent at right angles to extend forwardly from the sheet of drawing to provide a pusher 336 adapted to engage a mating portion 332 of the sliding piece 331. An operating knob 330' is secured to the left-hand edge of the release lever 330, and extends through a vertically elongated slot 286a formed in the left-hand sidewall 286 of the tape recorder 401 to the exterior thereof for manual operation.

FIG. 14 shows a condition in which the knob 330' is operated to move the release lever 330 to its lower position and the sliding plate 321 is in its upper position to permit a record/playback operation of the tape recorder 401. When the tape end is reached under this condition, the tape tension causes the contacting element 324 to be forced down, whereby the contact lever 326 rotates clockwise, bringing the projection 326c on the arm 326b to the left into abutment against the sliding piece 331 located on the claw lever 335, thus driving it to the left. The hook 335' at the lower end of the claw lever 335 is disengaged from the mating portion 321a of the sliding plate 321, which is therefore free to move to its lower stop position under the resilience of the spring 336, terminating an operation of the tape recorder 401. In this manner, the operation of the auto shut-off device is achieved.

When the knob 330' is moved upward to move the release lever 330 to its upper position, the nipple 278 engages a dimple formed in the chassis 269, thus locking the release lever. The pusher 336 of the release lever 330 bears against the mating portion 332 at the lower end of sliding piece 331, which is therefore raised against the resilience of the spring 333. The sliding piece 331 eventually assumes a position in which it does not block a movement of the projection 326c of the contact lever 326 to the left.

As the release lever 330 is moved upward, the switch 334 also moves in the same direction, whereby the free end of the movable contact is located just to the left of the projection 326c. When a tape end is reached under this condition, the tape tension forces the contacting element 324 down to cause a clockwise rotation of the contact lever 326, whereby the projection 326c moves to the left, bearing against the movable contact of the switch 334. Thereupon the switch 334 is closed, illuminating a tape end display (not shown) which is connected with this switch. Thus, a manual operation to move the knob 330' to its upper position has achieved a switching from a tape end warning through the auto shut-off to a tape end display.

Figure 15:
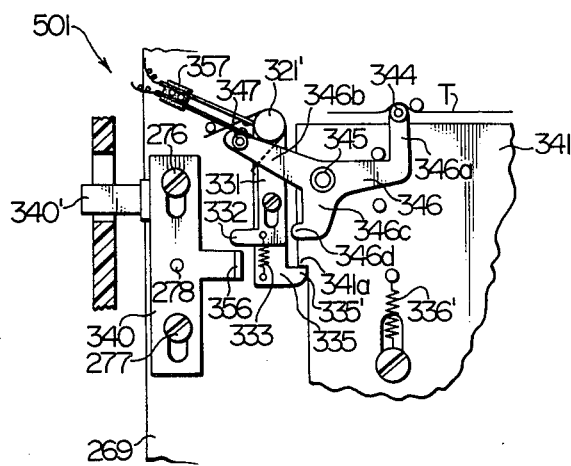
FIG. 15 is a plan view, partly in section, of a tape end detector according to a further embodiment of the invention which is assembled into a cassette tape recorder playing a compact cassette.

FIG. 15 is a plan view of an additional embodiment of the invention as applied to a tape recorder playing a compact cassette and which is provided with an auto shut-off device. This embodiment also disables a tape end warning through the auto shut-off and enables a tape end display. Again, parts corresponding to those shown in FIG. 14 are designated by like reference characters and will not be described.

Referring to FIG. 15, a contact lever 346 has its central portion rotatably mounted on a shaft 345 which is fixedly mounted on a sliding plate 341. The lever 346, includes three arms. A first arm 346a extends to the right and then upwardly, with a contacting element 344 mounted on the free end thereof for contact with the tape T. A second arm 346b extends upwardly and to the left, with a switch actuating member 347 in the form of a short sleeve secured to the free end thereof. A third arm 346c extends downwardly, with its free end extending to the left to provide a projection 346d. The projection 346d is located adjacent to the right-hand edge of a sliding piece 331 which is disposed adjacent to the left-hand side of a sliding plate 341, and is engageable with the sliding piece 331 to drive it to the left.

A release lever 340 is formed with a pair of vertically spaced, elongated guide slots which are engaged by pins 276, 277 fixedly mounted on the chassis 269 adjacent to the left-hand sidewall of the tape recorder 501 so as to make the lever 340 slidable in the vertical direction. The release lever 340 is centrally formed with an arm which extends to the right, with its free end being bent at right angles to extend forwardly from the sheet of drawing, providing a pusher 356 engageable with a mating portion 332 of the sliding piece 331.

A normally open switch 357 is disposed on the chassis 269 on the left, upper portion thereof, and includes a movable contact, the free end of which is located opposite to switch actuating member 347 secured to the free end of the second arm 346b of the contact lever 346. The switch 357 is electrically connected with a tape end display, not shown.

FIG. 15 shows a condition in which the knob 340' is operated to move the release lever 340 to its lower position so that when a tape end is reached, the auto shut-off device is operable to bring the tape recorder 501 to its stop position while the sliding plate 341 is in its upper position to permit a record/playback operation of the recorder 501. When a tape end is reached under this condition, the tape tension causes the contacting element 344 to be forced down to cause a clockwise rotation of the contact lever 346, with the projection 346d on the third arm 346c bearing against the right-hand edge of the sliding piece 331 to drive it to the left. In response thereto, the claw lever 335 which is integral with the sliding piece 331 moves to the left, disengaging the hook 335' from its mating portion 341a of the sliding plate 341, which is therefore free to move downward under the resilience of the spring 336'. The sliding plate comes to a stop at its lower stop position, where the operation of the tape recorder 501 is terminated. In this manner, the operation of the auto shut-off device is achieved.

When the knob 340' is moved to its upper position, the release lever 340 is brought into and maintains its upper position by the engagement between the nipple 278 and a corresponding dimple formed in the chassis 269. The pusher 356 bears against the mating portion 332 of the sliding piece 331, which is therefore caused to move upward against the resilience of the spring 333. This brings the sliding piece 331 to a position out of the path of movement to the left of the projection 346*d* of the contact lever 346. When the tape end is reached under this condition, the tape tension forces the contacting element 344 down to cause a clockwise rotation of the contact lever 346, whereby the second arm 346*b* thereof rotates in the same direction to press against the free end of the movable contact of the switch 357. The resulting closure of the switch 357 illuminates the tape end display connected therewith. In this manner, a manual operation of the knob 340' to its upper position disables the warning through the auto shut-off operation and enables the tape end display, which is illuminated.

What is claimed is:

1. A tape end detection apparatus for a tape recorder having a swingably mounted member including a shaft for supporting a tape hub having a tape secured thereto and wound therearound, said shaft causing said member to swing in a predetermined direction when the tape is substantially completely unwound from said tape hub;

normally open switch means and means responsive to movement of said member in said predetermined direction for closing said switch means;

release means movable between a first position which prevents and a second position which permits said switch closing means to engage and thereby close said switch means when a tape end condition occurs;

a magnetic head means and tape drive means mounted upon a common movable member;

means for placing said movable member in an operating position wherein said magnetic head and tape drive means engage said tape; and said movable member including means for placing said release means in said second position when said movable member is moved either into or out of said operating position.

2. The apparatus of claim 1 further comprising audible alarm means connected with said switch means and activated upon closure of said switch means.

3. A tape end detection apparatus for use in a tape recorder of the type which is operable in a record, a playback and a stop mode, said apparatus comprising:

tape end indicating means for indicating an end of tape condition while said tape recorder is in said record or said playback mode;

manually operated means, operable while said tape recorder is in said record or said playback mode, for selectively enabling and disabling said tape end indicating means while not effecting the continued operation of said recorder in said record or playback mode; and means for automatically resetting said manually operated means to enable said tape end indicator means whenever said tape recorder is placed into a record or playback mode.

4. A tape end detection apparatus of claim 3 further including means for preventing said manually operated means from disabling said tape end indicating means except when said recorder is in said record or playback mode.

5. A tape end protection apparatus for a tape recorder, comprising:

tape end indicating means for indicating an end of tape condition;

manually operated means for selectively enabling and disabling said tape end indicating means; and means for preventing said manually operated means from disabling said tape end indicating means except during a record or playback operation.

* * * * *